United States Patent [19]

Burgarella et al.

[11] 4,174,893
[45] Nov. 20, 1979

[54] EXPOSURE CONTROL SYSTEM FOR USE IN PHOTOGRAPHIC CAMERA APPARATUS

[75] Inventors: John P. Burgarella, Sudbury; Peter P. Carcia, Reading, both of Mass.

[73] Assignee: Polaroid Corporation, Cambridge, Mass.

[21] Appl. No.: 860,639

[22] Filed: Dec. 14, 1977

[51] Int. Cl.² .............................................. G03B 7/14
[52] U.S. Cl. ...................... 354/29; 354/59; 354/60 L; 354/27
[58] Field of Search ............... 354/23 R, 24, 30, 31, 354/36, 38, 53, 60 R, 60 E, 60 L, 83, 234, 235, 247, 254, 267, 268, 42, 59, 49, 27; 250/227; 355/1

[56] References Cited

U.S. PATENT DOCUMENTS

| | | | |
|---|---|---|---|
| 3,518,926 | 7/1970 | Bing | 354/42 |
| 3,605,600 | 9/1971 | Morokuma | 354/60 L X |
| 3,611,892 | 10/1971 | Ort | 354/42 |
| 3,672,284 | 6/1972 | Schwarz | 354/23 R |
| 3,685,901 | 8/1972 | Crete | 355/1 X |
| 3,842,424 | 10/1974 | Tsunekawa et al. | 354/31 |
| 3,855,601 | 12/1974 | Uchiyama et al. | 354/31 |
| 3,858,224 | 12/1974 | Heaney | 354/60 R X |
| 3,860,936 | 1/1975 | Harvey | 354/53 X |
| 3,879,137 | 4/1975 | Sakazaki et al. | 354/23 R X |
| 3,928,859 | 12/1975 | Peterson | 354/27 |
| 3,942,183 | 3/1976 | Whiteside | 354/29 |
| 4,007,469 | 2/1977 | Land et al. | 354/53 X |
| 4,021,663 | 5/1977 | Takahashi | 250/227 |

*Primary Examiner*—L. T. Hix
*Assistant Examiner*—William B. Perkey
*Attorney, Agent, or Firm*—Francis J. Caufield

[57] ABSTRACT

A photographic camera apparatus is provided with an exposure control system which includes a single photodetector, a pair of separate light paths arranged to transmit scene light onto the photodetector's surface, and a blade apparatus all of which cooperate in a pre-exposure mode to transmit scene light along one light path to provide a photodetector output which is utilized to measure and indicate the presence of a low scene brightness condition requiring the use of an artificial light source to illuminate the scene, and thereafter cooperate, during an exposure mode, to transmit scene light along the other light path to the photodetector's surface and utilize the photodetector's output in a manner to control the amount of exposure delivered to film located within the camera.

22 Claims, 9 Drawing Figures

EXPOSURE CONTROL SYSTEM FOR USE IN PHOTOGRAPHIC CAMERA APPARATUS

BACKGROUND OF THE INVENTION

1. Field of the Invention

This invention generally relates to automatic exposure control systems for use in photographic camera apparatus, and, more particularly, to an arrangement between a single photodetector and an electro-mechanical shutter which cooperate in a pre-exposure mode to detect the presence of a low scene brightness condition, and in an exposure mode, to control the exposure delivered to a photosensitive film.

2. Description of the Prior Art

It is generally well known among photographers that the light reflected from a scene to be photographed at times is insufficient to take sharp, acceptably exposed pictures without using a source of artificial illumination such as a photoflash lamp or strobe to supplement the available natural light.

Determining exactly when the available natural light is insufficient to provide a proper level of scene illumination, however, is a fairly complex process which involves a consideration of such factors as film speed, camera exposure delivery capability, and the shutter speed at which camera motion is likely to cause blurred pictures.

Those skilled in the photographic arts have recognized the problems associated with determining when there is adequate natural light and have provided well known apparatus (light meters) for use with cameras having manual shutters by which a photographer can measure the scene brightness and quickly correlate the relationships between the important factors and the measured scene brightness to determine if an auxiliary light source is necessary.

In the case of cameras having automatic exposure systems where the photographer has little control over shutter speed or f-number or both, and, probably does not know what the shutter program is for any scene brightness, those skilled in the art have provided apparatus by which the photographer is automatically alerted of the presence of a scene brightness condition which will cause exposure problems.

Examples of the latter type of apparatus are well known in the patent literature. For instance, U.S. Pat. No. 3,611,892 issued to Wolfgang Ort et. al. on Oct. 12, 1971 and entitled "Device for Indicating Underexposure in Photographic Cameras with Automatic Exposure Control", discloses a device for automatically indicating an underexposure condition and setting a diaphragm aperture in response to the movement of a shutter release member which is depressed by the photographer. This device, however, requires the use of a separate fixed-speed shutter which is not automatically controlled by a photocell to provide the correct exposure interval during which the diaphragm aperture is opened.

Another example is described in U.S. Pat. No. 3,855,601 issued to Takashi Uchiyama et. al. where the patentees describe a camera which has a built-in low light level indicator in the sense that a changeover means will operate a display when the output of a comparator is such as to indicate that flash illumination is required. Two photocells are used here which do not appear to be associated with the camera shutter.

A further example is described in U.S. Pat. No. 3,928,859 issued to Dean M. Peterson on Dec. 23, 1975 and entitled "Shutter-Iris for Automatic Camera". Here the patentee describes an automatic camera which generates an anticipatory signal about 3 milliseconds after the start of an exposure interval. If sufficient light is present, a flash circuit is deactivated; if not, the flash is activated. The photocell of the camera is positioned to respond to light reflected from the film. Light from the scene being photographed is not applied to the photocell prior to the incidence of light onto the film and thus there is no preexposure indication to warn the photographer of a low scene brightness condition.

In U.S. Pat. No. 4,007,469 issued to Edwin H. Land et. al. on Feb. 8, 1977, entitled "Photographic Apparatus with Plurality of Selectively Determinable Operational Modes", the patentees describe a camera which includes a counter-reciprocating shutter blade arrangement, two photocells, and associated circuitry which, among other things, provide a visual display in the camera's viewfinder indicating the presence of a low scene brightness condition and the absence of a fully charged strobe condition.

Thus low light level indicators have heretofore either failed to provide a pre-exposure warning to indicate the presence of a low scene brightness prior to exposure or utilized at least two photocells in order to provide the pre-exposure warning with one of the photocells while controlling the actual film exposure by way of the other photocell.

Therefore it is a primary object of this invention to provide an automatic exposure control system having a scanning type, counter-reciprocating shutter blade and a single photodetector whose output is initially used in a pre-exposure mode to detect and indicate the presence of a low scene brightness condition and, thereafter, is used in an exposure mode to control the exposure delivered to the film.

Other objects of the invention will in part be obvious and will in part appear hereinafter. The invention accordingly comprises the apparatus possessing the construction, the combination of elements, and arrangement of parts which are exemplified in the following detailed disclosure.

SUMMARY OF THE INVENTION

This invention relates to photographic camera apparatus of the type having an automatic exposure control system which operates in a pre-exposure mode to detect the presence of a low scene brightness condition, and in an exposure mode, to control the exposure delivered to a photosensitive film positioned within the camera.

The camera apparatus is of the type which has means for defining an optical path and a film plane in which a photosensitive film may be positioned in readiness for exposure, and comprises light detecting means, including a photodetector having a predetermined photosensitive surface, for providing an output signal having an electrical characteristic which varies as a function of the intensity of the scene light incident on the photodetector.

Also included in the camera apparatus are means for providing a first and a second light path for transmitting light from the scene to the photodetector's surface; each of the first and second light paths having light entrances which face the scene and are offset with respect to one another.

Also provided in the camera apparatus is a blade apparatus and means for mounting the blade apparatus for displacement between a first arrangement and a second arrangement. In the first arrangement, the blade apparatus simultaneously is in light blocking relation to both the optical path and the first light path thereby precluding scene light from being transmitted along both the optical path and the first light path and in light unblocking relation to the second light path thereby allowing light from the scene to be transmitted along the second light path and onto the photodetector's surface. In its second arrangement, the blade apparatus is simultaneously in light unblocking relation to both the optical path and the first light path and in light blocking relation to the second light path. The blade apparatus comprises first portions structured to define a varying primary aperture, aligned with the optical path, which changes from an initial value to a final value during displacement of the blade apparatus from its first arrangement to its second arrangement, and to define a secondary varying aperture, aligned with the photodetector, which also changes from an initial value to a final value during displacement of the blade apparatus from its first to its second arrangement, and at least one other portion adapted to block the second light path prior to the first portion's defining the initial aperture value of the secondary varying aperture. The initial values of both the primary and secondary varying apertures occur generally at substantially the same time.

Drive means are provided which are actuable for displacing the blade apparatus between its first and second arrangements.

Additionally provided are means energizable at least in part by a source of electrical energy for monitoring the output signal of the light detecting means and measuring scene brightness while the blade apparatus is in its first arrangement and providing a discernible signal that has one characteristic which indicates that the scene brightness is below a predetermined level, for actuating the drive means to displace the blade apparatus from its first arrangement toward its second arrangement to provide the primary and secondary varying apertures aligned, respectively, with the optical path and the first light path thereby initiating an exposure interval during which scene light is transmitted substantially simultaneously along the optical path through the primary varying aperture and along the first light path onto the photodetector's surface through the secondary varying aperture, for integrating the output signal of the light detecting means beginning substantially at the commencement of the exposure interval, and actuating the drive means when the time integral of the output signal reaches a predetermined value to displace the blade apparatus to again block the optical path and the first light path thereby terminating the exposure interval; the blade apparatus serving to block the second light path during the exposure interval.

An important feature of the preferred embodiment of the camera apparatus is the provision of means for inhibiting the actuation of the drive means to inhibit exposure of the film if the scene brightness, as measured when the blade apparatus is in its first arrangement, is below the predetermined brightness level which requires the use of an auxiliary light source to illuminate the scene.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts and wherein:

DESCRIPTION OF THE PREFERRED EMBODIMENT

Figure 1:
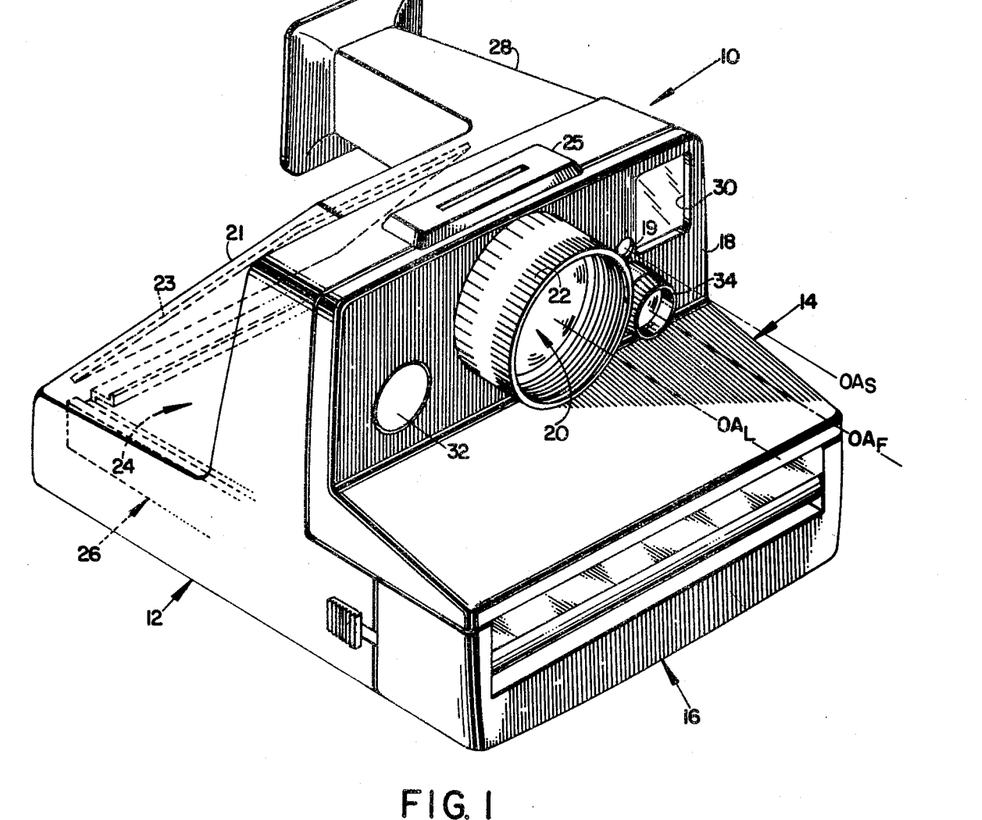
FIG. 1 is a perspective view of a camera apparatus embodying the features of this invention.

Referring now to FIG. 1, there is shown a photographic camera apparatus 10 in which the present invention is incorporated. The camera 10 may be of the rigid body or box type and comprises a body 12, a front cover 14 and a door 16 which interconnect to define its outward appearance and serve as a protective enclosure for housing the apparatus's interior components. The body 12, the front cover 14, and the door 16 are preferably fabricated of an opaque plastic using injection molding techniques in order to simplify their manufacture and reduce costs.

Located in a vertical forward wall 18 of the front cover 14 is a photographic objective taking lens 20 having an optical axis, $OA_L$, therethrough. The objective taking lens 20 may be a Cooke Triplett or similar multi-element type of lens which may have its focal length changed by adjusting the axial air spacing between its optical elements. This may be accomplished in a well-known manner by rotating a bezel, such as that designated at 22, which extends through an opening in the front cover 14 and is coupled with a screw-threaded lens mount (not shown).

Located in the base of the body 12 is a well-known film cassette receiving chamber 24 that is adapted to hold a film cassette, such as that designated at 26, in position for exposure through the objective taking lens 20. The film cassette 26 is preferably of the type which includes a stacked array of self-processable type film units (not shown). Located in the base of the film cassette 26, underneath the stacked array of self-processable film units, is a rectangular flat thin battery (not shown) which may be used to supply power to the various electrical components of the camera apparatus 10. An example of such a film cassette is disclosed and described in detail in U.S. Pat. No. 3,872,487 issued to Nicholas Gold on Mar. 18, 1975 and entitled "Photographic Film Assemblage and Apparatus".

The body 12 also includes a generally planar rear wall 21 slanted at a predetermined angle with respect to the film cassette 26 and the optical axis, $OA_L$, of the objective taking lens 20. Attached to the rear wall 21 is a trapezoidal-shaped mirror 23 positioned along the optical axis, $OA_L$, of the objective taking lens 20, intersecting it at a predetermined angle, to fold the optical axis of the objective taking lens 20 so as to establish a folded optical path between the objective taking lens 20 and a forwardmost one of the plurality of stacked self-processable film units contained in the film cassette 26. With this optical arrangement, rays from a photographic scene which emerge from the objective taking lens 20 may be reflected from the mirror 23 onto a forwardmost one of the film units of the film cassette 26. In the foregoing manner, the photographic camera apparatus 10 is provided with means for defining a film plane and an optical path for transmitting light from a scene along the optical path to expose photosensitive film located in the film plane.

Generally designated at 25 is a well-known flash socket that is adapted to receive a linear photoflash array 31 (see FIG. 5) which is also of a well-known type. Such a flash socket is described in considerable detail in, for example, U.S. Pat. No. 3,757,643 issued to John P. Burgarella on Sept. 11, 1973 and entitled "Photoflash Apparatus". With this arrangement an artificial light source, such as the linear flash array 31, may be used with the camera apparatus 10 as a source for illuminating the photographic scene in the event that the natural light available is below a predetermined level below which it would be difficult to take sharp well-exposed pictures.

Extending rearwardly from the body 12 is an elongated hollow portion 28 of the body 12 in which may be disposed a well-known viewfinder. The viewfinder may be of the reversed Galilean type which has an elongated eye relief aperture to improve magnification. The optical components of the viewfinder may be supported and protected within the elongated hollow portion 28 in such a manner so as to permit a photographer to aim the photographic apparatus 10 so that the subject matter of the picture to be photographed may be framed within an opening 30 located in the vertical forward wall 18 of the front cover 14. Those skilled in the art will recognize that the field of view of such a viewfinder may be made to be substantially coextensive with the field of view of the photographic camera apparatus 10.

Also located in the vertical forward wall 18 is an actuator button 32 which extends through an opening in the vertical wall 18 so as to be accessible to a photographer so that he may depress the actuator button 32 to initiate a photographic cycle in a manner to be subsequently described.

Figure 5:
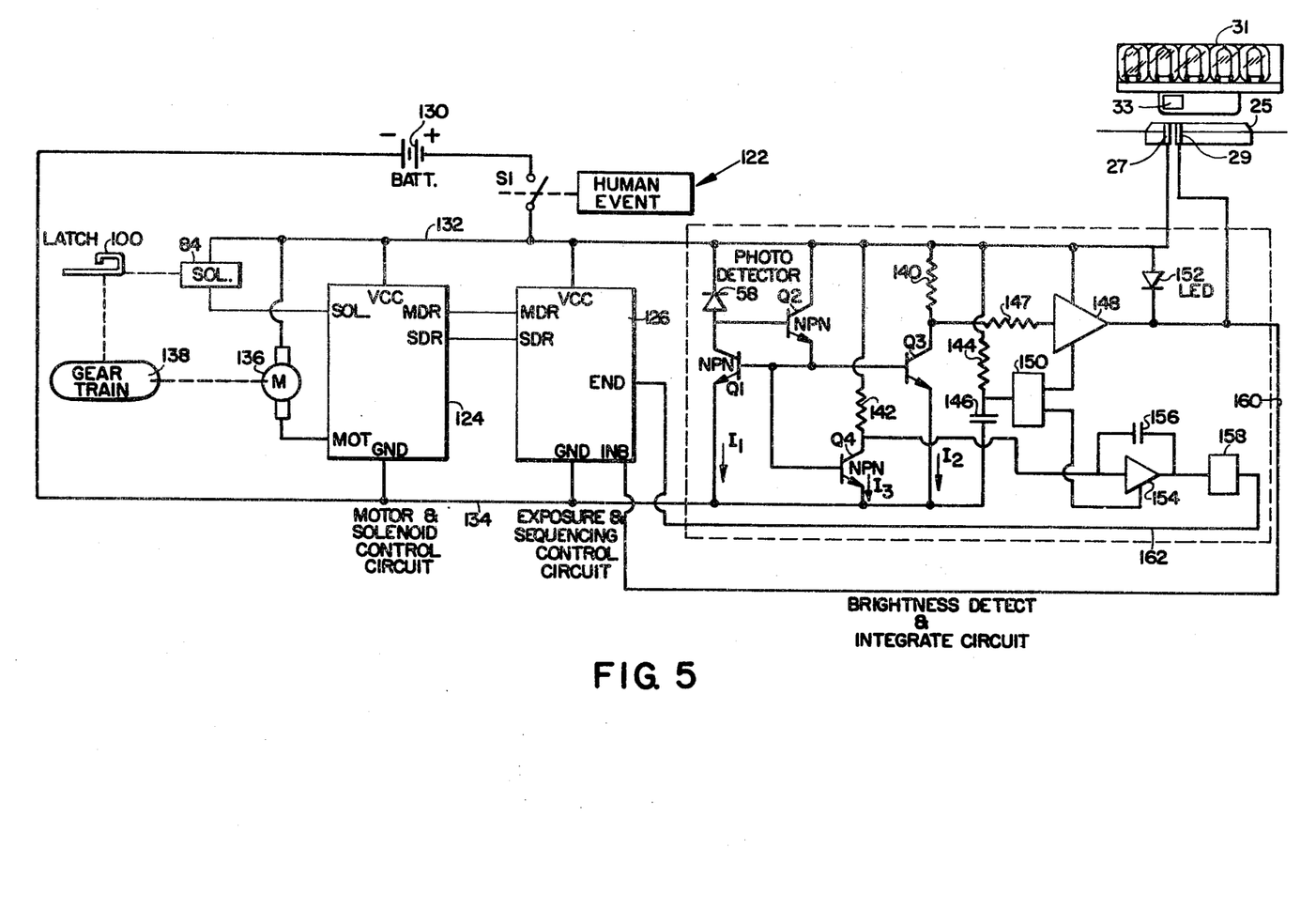
FIG. 5 is a schematic of a circuit which forms part of this invention.
Figure 6:
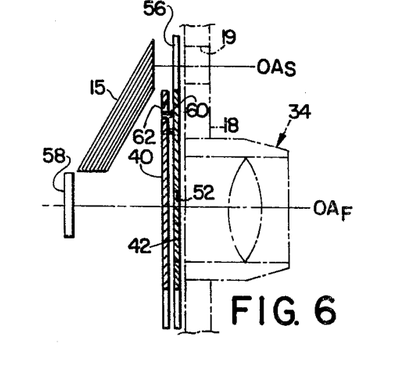
FIG. 6 is a cross-sectional view of a portion of the exposure control system of the invention taken along line 6—6 of FIG. 2.

Projecting through yet another opening in the vertical forward wall 18 is an optical lens system 34 which is used for collecting radiation in a selective manner from the scene to be photographed and directing the collected radiation onto a photodetector 58 located along an optical axis, $OA_F$, and behind the optical lens system 34 (see FIG. 6). Although the photodetector 58 is not shown in FIG. 1, it is shown in FIGS. 2-6 and generally operates to provide an output signal whose magnitude varies in accordance with the brightness of the photographic scene as will be subsequently described.

Located in the vertical forward wall 18, directly above the optical lens system 34, is an aperture 19. The aperture 19 is positioned along an optical axis, $OA_S$, that is generally parallel with the optical axis, $OA_F$. Arranged in this manner, the aperture 19 operates to admit light from the scene into the interior of the body 12 where, as can best be seen in FIG. 6, it is received by one end (the entrance end) of an elongated fiber optic bundle 15. The other end of the fiber optic bundle 15 (the exit) is positioned to direct scene light that is transmitted along the length of the fiber optic bundle 15 onto the surface of the photodetector 58.

In this manner, the camera apparatus 10 is provided with means for providing a first and a second light path for transmitting light from the scene onto the surface of the photodetector 58; each of the light paths having light entrances which face the scene and are offset with respect to one another. Those skilled in the art will appreciate that scene light emerging from the optical lens system 34 proceeds directly to the surface of the photodetector 58 without changing direction while scene light which passes through the aperture 19 and is received by the entrance end of the fiber optic bundle 15 experiences a plurality of direction changes by virtue of the multiple reflections it undergoes in traveling the length of the fiber optic bundle 15.

The camera apparatus 10 is provided with an exposure control system which, as will be seen, is structured to deliver to film units of the film cassette 26 an exposure of predetermined value, to provide to the user of the apparatus 10 a visual indication that the scene brightness is below a predetermined value which requires that the apparatus 10 be used with an artificial light source to illuminate the scene, and to inhibit exposure if the scene brightness is below the predetermined brightness and an artificial source of illumination is not operatively connected with the apparatus 10.

Figure 2:
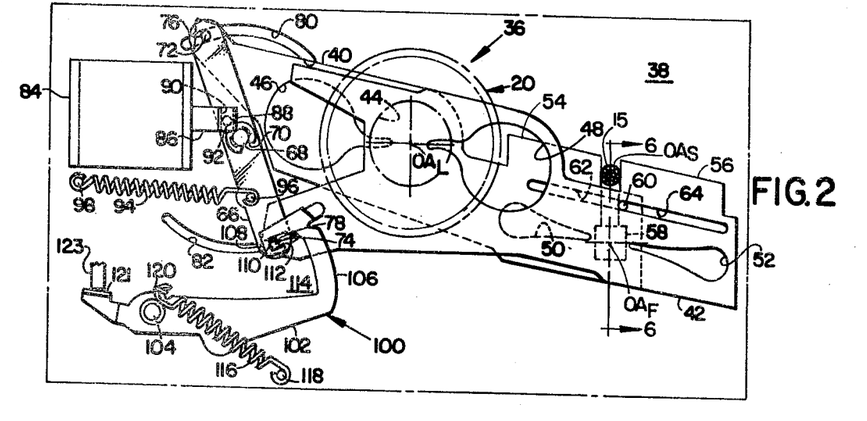
FIG. 2 is a front cross-sectional view of a portion of the exposure control system of this invention.
Figure 3:
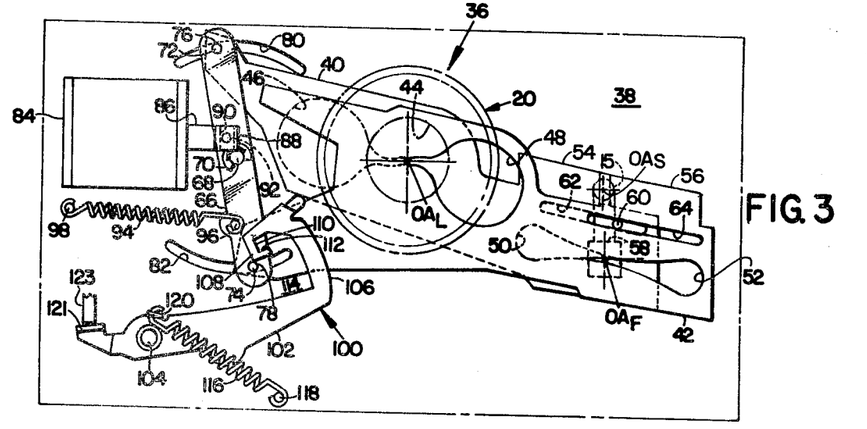
FIG. 3 is a front cross-sectional view of the exposure control system of FIG. 2 in a different mode of operation.
Figure 4:
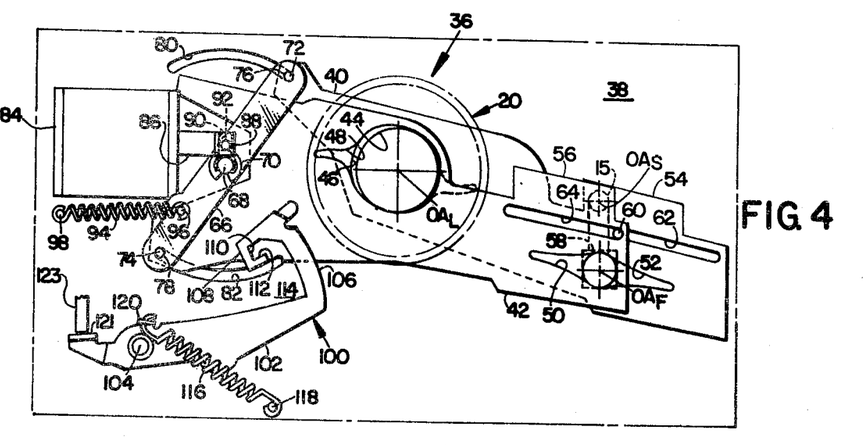
FIG. 4 is a front cross-sectional view of the exposure control system of FIG. 2 in still another mode of operation.

Referring now to FIGS. 2-4, there is shown generally designated at 36 an exposure control mechanism which forms part of the exposure control system for the apparatus 10. The exposure control mechanism 36 is generally located within the housing 12 intermediate the objective taking lens 20 and the location of the film units of the film cassette 26. More particularly, the exposure mechanism 36 resides just behind the vertical forward wall section 18 of the front cover 14 where it is in a position to block and unblock the optical path of the camera apparatus 10 and the first and second light paths to the photodetector 58 in a manner to be described.

As shown in FIGS. 2-4, the exposure mechanism 36 comprises a base block 38 which is fixedly stationed within the housing 12 and selectively shaped to support the various components of the exposure mechanism 36. Centrally disposed within the base block 38 there is an exposure opening 44 which defines the maximum available exposure aperture for the camera apparatus 10, and which is positioned so that its center is coincident with the optical axis, $OA_L$, of the objective taking lens 20. Mounted on the base block 38 there is a blade apparatus which includes two overlapping opaque shutter blade elements 40 and 42 of the so-called "scanning type" which will be subsequently described in greater detail herein.

A pair of scene light admitting primary apertures 46 and 48 are provided respectively in the blade elements 40 and 42 to collectively define a progressive variation of effective primary aperture openings in accordance with simultaneous longitudinal and lateral displacement of one blade element with respect to the other blade element in a manner as is fully described in U.S. Pat. No. 3,942,183 issued to George D. Whiteside on Mar. 2, 1976 and entitled "Camera With Pivoting Blades". The apertures 46 and 48 are selectively shaped so as to overlap the base block aperture 44 thereby defining a gradually varying effective aperture size as a function of the position of the blade elements 40 and 42.

Each of the blades 40 and 42 are additionally configured to have corresponding photocell sweep secondary apertures shown respectively at 50 and 52. Secondary apertures 50 and 52 may be configured in correspondence with the shapes of the scene light admitting primary apertures 46 and 48. As is readily apparent, the secondary apertures 50 and 52 also move in correspondence with the primary apertures 46 and 48 to define a small secondary effective aperture for admitting the passage of scene light transmitted through the optical system 34 which is located in the front cover 14.

Scene light which emerges from the optical system 34 from the scene to be photographed may pass through the opening formed by the secondary apertures 50 and 52 to impinge upon the photodetector 58, previously mentioned, when the secondary apertures 50 and 52 are aligned with the photodetector 58.

A pair of specially configured portions or tabs 54 and 56 are provided on the blades 40 and 42, respectively. The tabs 54 and 56 each define an extension of a respective longitudinal edge of the blades 40 and 42 located respectively adjacent apertures 50 and 52. As best illustrated in FIG. 2, the extended tabs 54 and 56 are spaced away from one another so as to be misaligned with the aperture 19 and the entrance end of the fiber optic bundle 15 so as to permit transmission of light from the scene along the second light path and onto the surface of the photodetector 58 when the blades 40 and 42 are in their first arrangement as illustrated in FIG. 2. When the blades 40 and 42 are positioned as shown in FIG. 3, the tabs 54 and 56 begin to overlap each other to block off the second light path to the photodetector 58, and as the blades 40 and 42 are moved toward their second arrangement as shown in FIG. 4, the tabs 54 and 56 progressively overlap each other thereby continuing to block the second light path to the photodetector 58 as long as the tabs 54 and 56 have overlapping portions.

Projecting from the base block 38 at a location spaced laterally apart from the base block aperture 44 is a pivot pin or stud 60 which pivotally and translatably engages elongated slots 62 and 64 formed in respective blade elements 40 and 42. Pin 60 may be integrally formed with the base block 38 and the blade elements 40 and 42 may be retained in engaging relationship with respect to the pin 60 by any suitable means such as peening over the outside end of the pin 60.

The opposite ends of the blade elements 40 and 42 respectively include extended portions which pivotally connect to a walking beam 66. The walking beam 66, in turn, is disposed for rotation relative to the base block 38 by pivotal connection to a projecting pivot pin or stud 68 which may also be integrally formed with the base block 38 at a location spaced laterally apart from the base block aperture 44. The walking beam 66 may be pivotally retained with respect to the pin 68 by conventional means such as an E-ring 70. In the preferred mode, the walking beam 66 is pivotally connected at its distal ends to the blade elements 40 and 42 by respective pin members 72 and 74 which extend laterally outward from the walking beam 66. Pin members 70 and 72 are preferably circular in cross-section and extend through respective circular openings 76 and 78 in respective blade elements 40 and 42 so as to slidably engage respective arcuate slots or tracks 80 and 82 which may be integrally formed within the base block 38. The arcuate tracks 80 and 82 cooperate to inhibit disengagement of the blade elements 40 and 42 from their respective pin members 72 and 74 during operation of the exposure mechanism 36. Thus, the walking beam 66 and blade elements 40 and 42 collectively define a blade apparatus with the means for mounting the blade apparatus for displacement including the pivot pins 72 and 74.

Drive means for displacing the blade apparatus include a tractive electromagnetic device in the form of a solenoid 84 which is employed to displace the blades 40 and 42 with respect to each other and the base block 38. The solenoid 84 includes an internally disposed cylindrical plunger unit 86 which retracts inwardly into the body of the solenoid 84 upon energization of the solenoid winding. The solenoid plunger 86 includes an end cap 88 at the outside end thereof together with a vertical slot or groove 90 within the end cap 88 for slidably engaging a pin 92 extending outwardly from the walking beam 66. In this manner, the solenoid plunger 86 is affixed to the walking beam 66 so that longitudinal displacement of the plunger 86 will operate to rotate the walking beam 66 around the pivot pin 68 so as to appropriately displace the shutter blades 40 and 42. The drive means also includes a tension spring 94 having one end pinned to the walking beam 66 via a pin 96 and its other end pinned to the base block 38 via a pin 98. With this arrangement, the spring 94 continuously urges the end cap 88 against the pin 92 of the walking beam 66 thereby also continuously urging the blade elements 40 and 42 toward a terminal arrangement as best illustrated in FIG. 4 in which the primary apertures 46 and 48 of the blade elements 40 and 42, respectively, overlap to provide the largest opening in alignment with the base block aperture 44. Thus, with the spring arrangement described here, the exposure mechanism 36 of this invention is biased to continuously urge the blade elements 40 and 42 into an open orientation.

In the present arrangement, the blades 40 and 42 are drawn from their open second arrangement as illustrated in FIG. 4 to their closed first arrangement as illustrated in FIG. 2 when the solenoid 84 is energized. Consequently, energization of the solenoid 84 prevents the blades 40 and 42 from moving towards their maximum primary aperture opening under the urging of the tension spring 94.

As shown in FIGS. 2–4, latch means are provided in the camera apparatus 10 by which the blade elements 40 and 42 may be releasably retained in their position illustrated in FIG. 2 and thereafter may be released to assume their position as shown in FIG. 4. The latch means include a latch member 100 having an elongated main body portion 102 disposed for rotation about a pivot pin or shaft 104 which may also be integrally formed with the base block 38. The main body portion 102 includes an integral arm portion 106 extending outwardly therefrom into overlapping relation therewith to ultimately define an integral hook portion 108. The hook portion 108 is adapted for releasable engagement with the pin 74 which also extends laterally outward from the side of the walking beam 66 as well as inwardly into the arcuate slot 82. More specifically, the hook portion 108 defines a first edge surface 110 which engages the pin 74 so as to inhibit clockwise rotation of the walking beam 66 about the pin 68. In addition, the hook portion 108 defines a second edge surface 112 which engages the bottom of the pin 74 to inhibit counterclockwise rotation of the latch member 100 about its pivot pin 104. A latch release slot designated generally at 114 accommodates release of the walking beam 66 from the hook portion 108 in a manner to be described. The latch member 100 is resiliently biased for yieldable clockwise rotation about the pivot pin 104 by a tension spring 116, one end of which is attached to a tab section 120 which extends laterally outward from the main body portion 102 of the latch member 100. The other end of the tension spring 116 is grounded with respect to the base block 38 by a pin member 118.

Located at the other end of the main body portion 102 of the latch member 100 is a bent over tab section 121 which extends outwardly from the main body portion 102. The tab section 121 is engaged by a latch actuating member 123 which is in turn mechanically associated with a gear train shown schematically at 138 in FIG. 5 which cooperate to rotate the latch member 100 about its pivot 104 between the positions illustrated in FIGS. 2-4 in a manner which is more fully described in U.S. Pat. No. 4,040,072 issued to Bruce K. Johnson et. al. on Aug. 2, 1977 and entitled "Shutter Latch Arrangement Releasable Through Shutter Blade Actuation and Resettable Through Film Advancement".

In the foregoing manner the photographic apparatus 10 is provided with a blade apparatus and means for mounting the blade apparatus for displacement between a first arrangement in which the blade apparatus is simultaneously in light blocking relation to both the optical path of the camera apparatus 10 and the first light path to the photodetector 58 thereby precluding scene light from being transmitted along both the optical path and the first light path and in light unblocking relation to the second light path to the photodetector 58 thereby allowing light from the scene to be transmitted along the second light path and onto the surface of the photodetector 58, and a second arrangement in which the blade apparatus is in light unblocking relation to both the optical path of the apparatus 10 and the first light path to the photodetector 58 and in light blocking relation to the second light path to the photodetector 58. The blade apparatus as described possesses features by which it defines a varying primary aperture, aligned with the optical path, which changes from an initial value to a final value during displacement of the blade apparatus between its first and second arrangements and defines a secondary varying aperture, aligned with the photodetector 58, which also changes from an initial value to a final value during displacement of the blade apparatus from its first to its second arrangement. As will be noted with reference to FIG. 3, the initial values of both the primary and secondary varying apertures occur at substantially the same displacement of the blade apparatus from its first arrangement as illustrated in FIG. 1. Also note with regard to FIG. 3 that the tabs 54 and 56 are slightly overlapped thereby blocking the second light path to the photodetector 58 just prior to the secondary apertures 50 and 52 overlapping to provide the secondary varying aperture aligned with the photodetector 58.

The camera apparatus 10 is provided with an electronic control system designated generally at 122 in FIG. 5. The control system 122 incorporates, among other things, the exposure mechanism 36 and the photodetector 58 to provide the camera apparatus 10 with a photographic cycle during which the scene brightness is measured to determine if an artificial light source should be used and to provide an exposure interval during which an exposure of predetermined value is delivered to film located in the film cassette 26 if the scene brightness is above the predetermined value which allows pictures to be taken utilizing the natural available light as the source for illuminating the scene.

The voltage required to operate the control system 122 and its associated elements may be derived from the battery of the film cassette 26 in a well-known manner or alternatively may be derived from a separate battery located within the camera apparatus 10. In either case, the voltage source for operating the control system 122 is designated as the battery 130 as shown in FIG. 5.

A switch S1 is provided for coupling the positive terminal of the battery 130 to a power line 132 while the negative terminal of the battery 130 is coupled to a ground line 134. The switch S1 is normally open and is mechanically coupled to the actuator button 32 in a well-known manner so that, when the user of the camera apparatus 10 depresses the actuator button 32, the switch S1 is closed.

The photodetector 58 is preferably a silicon photodiode having its cathode connected to the power line 132 and its anode connected in common with the collector of an NPN transistor Q1 and the base of an NPN transistor Q2. The emitter of the transistor Q1 is connected to the ground line 134. The collector of the transistor Q2 is connected to the power line 132 while its emitter is connected in common with the base of the transistor Q1 and the base of another NPN transistor Q3. The collector of the transistor Q3 is connected to the power line 132 via a resistor 140 while its emitter is connected to ground.

Connected in this mode of operation, the photodetector 58 operates in a reversed biased manner to produce a current output which is linearly proportional to the intensity of the scene brightness as seen through the optical system 34 or through the aperture 19 via the fiber optic bundle 15.

Transistor Q2 operates to balance the base currents of the transistors Q1 and Q3. The transistors Q1 and Q3 connected in this manner are matched devices having equal base-to-emitter potentials. However, the emitter area of the transistor Q3 is chosen to be larger than the emitter area of the transistor Q1 so that the emitter current, $I_2$, of the transistor Q3 will be larger than the emitter current, $I_1$, of the transistor Q1 in proportion to the ratio of the areas of the emitters of the transistors Q1 and Q3. The resistor 140 operates to bias the collector of transistor Q3. Those skilled in the art will recognize this circuit arrangement as a well-known current multiplier. Thus, as the intensity of the scene brightness increases, the current, $I_1$, also increases in proportion to the intensity of the scene brightness while the current, $I_2$, increases by a multiple of the current, $I_1$, also in correspondence with increasing intensity of the scene brightness.

In the foregoing manner, light detecting means, including a photodetector, are provided in the camera apparatus 10 for providing an output signal having an electrical characteristic which varies as a function of the intensity of the scene light incident on the photodetector 58.

Connected in common with the resistor 140 and the collector of the transistor Q3 is a resistor 147 which is connected to the input of a comparator 148. The comparator 148 is preferably a level detector such as a Schmitt trigger device having a high voltage output signal (logic 1) when its input exceeds a predetermined level corresponding to the predetermined scene brightness level above which it is safe to take pictures utilizing the available natural light as a source for illuminating the scene and to have a low output signal (logic 0) when its input falls below the predetermined scene brightness level. In this manner means are provided for monitoring the output signal of the light detecting circuit and measuring the scene brightness to provide a discernible signal that has at least one characteristic which indicates that the scene brightness is below a predetermined level.

A light emitting diode (LED) 152 has its cathode connected to the output of the comparator 148 and its anode connected to the power line 132. Connected in this manner the LED 152 is arranged to turn on when the output of the comparator 148 produces a logic 0 and to turn off when the output of the comparator 148 produces a logic 1. The LED 152 is preferably positioned within the body portion 28 of the housing 12 so that when it turns on, it emits a light signal which is visible to the user of the camera apparatus 10 indicating that the scene brightness level is below the predetermined value which requires the use of an artificial light source to illuminate the scene for proper exposure.

A timing network is provided in the control system 122 for turning off the comparator 148 and simultaneously turning on an integrator circuit comprising an operational amplifier 154 having a feedback capacitor 156. The timing network comprises a resistor 144 having one end connected to the power line 132 and the other end connected in common with the positive terminal of a capacitor 146. The negative terminal of the capacitor 146 is connected to the ground line 134. Connected in common with the positive end of the capacitor 146 and one end of the resistor 144 is the input to a conventional monostable multivibrator 150 (one shot) which has two output lines, one of which is connected to the comparator 148 and the other of which is connected to the operational amplifier 154. Both outputs of the "one shot" 150 provide a high voltage output signal at a predetermined time after the switch S1 is closed. The predetermined time is related in part to the values of the resistor 144 and the capacitor 146 as is well known to those skilled in the art. When the outputs of the "one shot" 150 go high, the comparator 148 is turned off and simultaneously the operational amplifier 154 is turned on.

Also connected to the power line 132 via a resistor 142 is the collector of a conventional NPN transistor Q4. The base of the transistor Q4 is connected in common with the bases of the transistors Q1 and Q3 while the emitter of the transistor Q4 is connected to the ground line 134. The value of the resistor 142 is identical to the value of the resistor 140 and the transistor Q4 is in other respects identical to the transistor Q3. Therefore the emitter current labeled, $I_3$, of the transistor Q4 is identical to the emitter current, $I_2$, of the transistor Q3. Connected in common with the collector of the transistor Q4 and one end of the resistor 142 is the input to the integrating circuit comprising the operational amplifier 154 and its feedback capacitor 156. Thus when the operational amplifier 154 is turned on by the output of the "one shot" 150, the current, $I_3$, will charge the capacitor 156. The integrating capacitor 156 and operational amplifier 154 provide the input to a conventional comparator 158 which is set to provide a high voltage output (logic 1) when the voltage output from the operational amplifier 154 exceeds a value related to the correct exposure of film units located in the film cassette 26 and to provide a low voltage output signal (logic 0) if the charge on the capacitor 156 is below the reference voltage.

Also provided in the control system 122 is an exposure sequence and control circuit 126 having one terminal labeled VCC connected to the power line 132 and another terminal labeled GND connected to the ground line 134. A terminal labeled END is connected to the output of the comparator 158 via the line 162 and a terminal labeled INB is connected to the output of the comparator 148 via a line 160. The exposure sequencing control circuit 126 operates to provide logic functions which are in part responsive to receiving signals at its terminal END and INB in a manner to be subsequently described.

Additionally provided is a motor and solenoid control circuit 124 which has one terminal labeled VCC connected to the power line 132 and another terminal labeled GND connected to the ground line 134. The solenoid 84 has one lead of its winding connected to an input terminal of the motor and solenoid control circuit 124 labeled SOL while the other end of its winding is connected to the power line 132. Also connected to the motor and solenoid control circuit 124 is a well-known motor indicated schematically at 136. The motor 136 has one of its terminals connected to the power line 132 while the other of its terminals is connected to the motor and solenoid control circuit 124 via the terminal labeled MOT. The motor 136 is mechanically associated with the gear train 138 to drive the gear train 138 in a well-known manner. The purpose of the motor and solenoid control circuit 124 is to provide the power requirements to both the motor 136 and the solenoid 84 in response to receiving a motor drive signal at a terminal labeled MDR and a solenoid drive signal at a terminal labeled SDR. The terminals labeled MDR and SDR of the motor and solenoid control circuit 124 are connected to correspondingly labeled terminals on the exposure sequencing control circuit 126. The manner in which both of these circuits operate will become apparent in the description of the operation of the camera apparatus 10 to follow. However, for a more detailed description of the nature and function of the motor and solenoid control circuit 124 and the exposure sequencing control circuit 126 and the relationship to the motor 136, the gear train 138, the solenoid 84, and the latch 100, reference may be had to U.S. Pat. No. 4,035,813 issued to George D. Whiteside on July 12, 1977 and entitled "Exposure Control System for Selectively Determining Exposure Interval" and U.S. Pat. No. 4,040,072 issued to Bruce K. Johnson et. al. on Aug. 2, 1977 and entitled "Shutter Latch Arrangement Releasable Through Shutter Blade Actuation and Resettable Through Film Advancement".

Having described the construction, the combination of elements and the arrangement of parts for the photographic camera apparatus 10, its operation will now be described with reference to FIGS. 2-7.

In describing the operation of the camera apparatus 10, it will be assumed first that a film cassette 26 is present in the film receiving chamber 24, that the camera is aimed at the scene to be photographed, that the brightness level is below a predetermined value which requires the use of an artificial light source to illuminate the scene to be photographed, and that no artificial light source, such as a linear flash array, is present in the flash socket 25. Under these conditions, when the photographer depresses the actuator button 32 the switch S1 is closed and the positive terminal of the battery 130 is electrically coupled with the power line 132 thereby supplying power to the motor solenoid control circuit 124, the exposure sequencing control circuit 126, and the various components of the brightness detect and integrate circuit. At this point the motor 136 and the solenoid 84 are deenergized and the blade apparatus 36 is in its first arrangement as illustrated in FIG. 2 wherein both the optical path of the photographic camera apparatus 10 and the first light path to the photodetector 58 are blocked thereby precluding scene light from reaching the film located in the cassette 26 and the surface of the photodetector 58 along the first light path thereto and wherein the second light path to the photodetector 58 is unblocked by the tabs 54 and 56 to permit light from the scene to impinge on the surface of the photodetector 58 via the second light path thereto. The photodiode 58 produces an output current which is proportional to the intensity of the scene brightness and the transistors, Q1, Q2, Q3 and Q4, are conducting to produce the currents, $I_1$, $I_2$ and $I_3$, as previously described since power is also supplied to these elements when the switch S1 is closed. It will be recalled that the current, $I_2$, is also proportional to the intensity of the scene brightness and is larger than the current $I_1$ by a multiple which is related to the ratio of the areas between the emitter of the transistor Q3 and the emitter of the transistor Q1. Because power is also supplied to the timing network at the closure of the switch S1, it begins its time out function at that time. The comparator 148, because it is also energized at the closure of the switch S1, instantaneously begins to respond in correspondence with the magnitude of the scene brightness. The input voltage to the comparator is compared with a reference voltage corresponding to a scene brightness level which is the threshold value above which the camera can be used to take pictures by utilizing the available natural light and below which the camera should be used with an artificial light source to illuminate the scene. Since it is assumed that the scene brightness is below the predetermined threshold value, the output of the comparator 148 is low (logic 0) thereby biasing the LED 152 on. The exposure sequencing control circuit 126 responds to the logic 0 output of the comparator 148 to inhibit energization of the solenoid 84 thereby inhibiting exposure of the film located in the film cassette 26 because the blades 40 and 42 cannot be displaced unless the solenoid 84 is energized. The light emitted from the LED 152 is visible to the photographer in the viewfinder of the camera apparatus 10 thereby alerting him with a visual signal that the camera apparatus 10 should be used with an artificial source of illumination.

In this manner the user of the apparatus 10 is immediately alerted that a low scene brightness condition exists and because of the inhibit feature of the control system 122 does not lose a picture because of underexposure or camera motion.

The operation of the camera apparatus 10 will now be described assuming that the scene brightness is above the predetermined threshold value and no artificial source of illumination is present in the flash socket 25. Under these conditions the intensity of the scene brightness will be sufficiently high enough to cause the input to the comparator 148 to be higher than its reference level thereby causing the output of the comparator 148 to go high (logic 1). As before, the timing network starts its time out function when the switch S1 is closed. The high output from the comparator 148 biases the LED 152 off so that it emits no light visible to the photographer. The exposure sequencing control circuit 126 responds to the logic 1 output of the comparator 148 by signaling the motor and solenoid control circuit 124, via the terminals labeled SDR interconnecting these two circuits, to energize the solenoid 84. When the solenoid 84 is energized, its cylindrical plunger 86 retracts into its body thereby causing the walking beam 66 to rotate in a counterclockwise fashion about its pivot 68 to a position (not shown) where the pins 72 and 74 butt up against the extreme ends of their corresponding arcuate slots 80 and 82. Displacement of the walking beam 66 to the extreme ends of the arcuate slots 80 and 82 causes the lower pin 78 to disengage from the hook portion 108 of the latch 100. The latch 100 is rotated in a counterclockwise fashion about its pivot 104 under the urging of the latch actuator member 123 to assume its position as shown in FIGS. 3 and 4. At this point the sequencing control circuit 126 deenergizes the solenoid 84 via the motor solenoid control circuit 124. When the solenoid 84 is deenergized, the walking beam 66 is caused to rotate about is pivot 68 in a clockwise fashion, as illustrated in FIGS. 3 and 4, under the influence of the tension spring 94 thereby causing the blade elements 40 and 42 to translate and rotate with respect to each other and the base block 38 and the photodetector 58.

Displacement of the blade elements 40 and 42 proceeds in a manner previously described to unblock the optical path of the camera apparatus 10 to expose the film located in the cassette 26.

As best illustrated in FIG. 3, corresponding ones of the first apertures 46 and 48 in respective blades 40 and 42 and corresponding ones of the second apertures 50 and 52 in respective blades 40 and 42 just begin to overlap each other to define initial aperture values at a predetermined displacement of the blade elements 40 and 42 from their first arrangement as illustrated in FIG. 2. As can be seen in FIG. 3, when this happens, the tabs 54 and 56 of respective blade elements 40 and 42 are slightly overlapped thereby blocking the second light path to the photodetector 58 so that no light can impinge on the surface of the photodetector 58 thereby reducing the output current of the photodetector 58. In general correspondence with the blades 40 and 42 assuming the position shown in FIG. 3, the predetermined time interval defined by the timing network elapses and the "one shot" 150 produces a high output at both of its terminals to turn the comparator 148 off and the operational amplifier 154 on.

As the blades 40 and 42 proceed toward their second arrangement (FIG. 4), corresponding ones of the second apertures 50 and 52 overlap each other to define a secondary varying aperture that is in alignment with the photodetector 58 as previously described thereby allowing light from the scene to impinge on the surface of the photodetector 58 via its first light path to again cause an increased current flow through the photodiode 58. Substantially simultaneously with the increased current flow through the photodiode 58, scene light is admitted through the base block aperture 44 to expose the film located in the cassette 26. In this manner an exposure interval is initiated during which scene light is admitted through the base block aperture 44 to expose film located within the cassette 26.

Since the operational amplifier 154 is turned on just prior to the initiation of the exposure interval, it, in combination with its feedback capacitor 156, begins to integrate the output current, $I_3$, until the capacitor 156 charges to the reference voltage level which is set in the comparator 158. When the reference or trigger level of the comparator 158 is reached, the comparator 158 produces a high voltage output (logic 1) at the input terminal of the exposure sequencing control circuit 126 which is labeled END. When the exposure sequencing and control circuit 126 receives the logic 1 signal at its END terminal, it reenergizes the solenoid 84 via the motor and solenoid control circuit 124. When energized, the cylindrical plunger 86 of the solenoid 84 retracts to cause the walking beam 66 to rotate again in a counterclockwise fashion about its pivot 68 so as to cause the blades 40 and 42 to return to and pass their first arrangement as shown in FIG. 2 thus terminating the exposure interval. Those skilled in the art will recognize that the reference level of the comparator 158 may be made to correspond to an exposure value which is appropriate for the particular film being used, the dynamics of the exposure mechanism 36, and its various aperture values.

After the solenoid 84 is reenergized in response to the exposure sequencing control circuit 126 responding to the logic 1 output of the comparator 158, the walking beam 66 assumes a position (not shown) but previously described in which the pins 72 and 74 are against extreme ends of respective arcuate slots 80 and 82. While in this position, the motor and solenoid control circuit 124 applies power to the motor 136 which in turn operates the gear train 138 to cause the latch actuator 123 to move from its position as illustrated in FIG. 4 back to its position as shown in FIG. 2 wherein the pin 74 is in readiness to be engaged by the hook portion 108 of the latch 100. When in this position, the motor and solenoid control circuit 124 deenergizes the solenoid 84 thereby allowing the walking beam 66 to rotate in a clockwise fashion about its pivot 68 into its first arrangement (FIG. 2) so that the pin 78 is trapped by the integral hook portion 108 of the latch 100 and is retained therein in a manner previously described.

Figure 7:
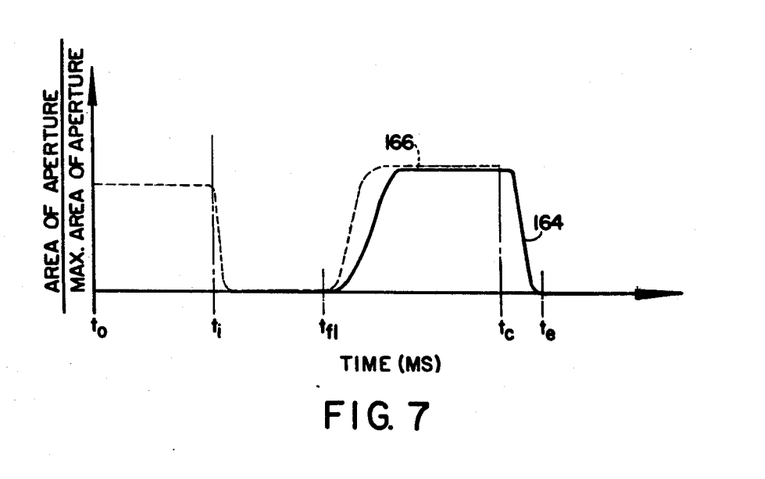
FIG. 7 is a graph illustrating how the areas of various apertures of the exposure control system of FIG. 2 vary during a typical photographic cycle of the camera apparatus of FIG. 1.

Referring now to FIG. 7, there is shown in curve 166 a plot which defines the combined effective light transmitting area (aperture) along both the first and second light paths to the photodetector 58 during a representative photographic cycle and the variation in the area of the aperture that is aligned with the optical path of the photographic apparatus 10 (curve 164) as defined by the first apertures 46 and 48. The areas represented by the curves 164 and 166 are expressed in normalized fashion. Note, however, with reference to the curve 166 that the maximum area (to the right of $t_{fl}$) is defined by the apertures 50 and 52 while the maximum area to the left of $t_{fl}$ is defined by the aperture 19 of the vertical forward wall 18. The time labeled $t_o$ in FIG. 1 represents the initiation of the photographic cycle when the actuator button 32 is depressed by the photographer. At the time labeled $t_i$ the solenoid 84 is first energized to cause the walking beam 66 to displace in a counterclockwise fashion as previously described, the time labeled $t_{fl}$ is the time at which the exposure interval is initiated, and the time $t_c$ is the time at which the solenoid 84 is reenergized to move the exposure mechanism 36 towards and past its first arrangement as illustrated in FIG. 2. The predetermined time as defined by the timing circuit is the time that elapses between $t_o$ to a time which is substantially the same as $t_{fl}$.

Included in the flash socket 25 are a pair of switch contacts 27 and 29 (FIG. 5) spaced apart to be normally open circuited. Switch contact 27 is connected to the power line 132 and switch contact 29 is connected in common with the output of the comparator 148.

The linear flash array 31, which may be used as an artificial light source to illuminate the scene, includes a blade-like conducting strip 33 which contacts the switch contacts, 27 and 29, when the flash array 31 is inserted into the flash socket 25. Thus, insertion of the flash array 31 into the flash socket 25 operates to create a high voltage at the output of the comparator 148. With this arrangement, the camera apparatus 10 operates as though the scene brightness were above the predetermined threshold value as described above because the signal received at the INB terminal of the exposure and sequencing control circuit 126 is at a logic 1 when the flash array 31 is inserted into the flash socket 25 regardless of the intensity of the actual scene brightness.

Figure 8:
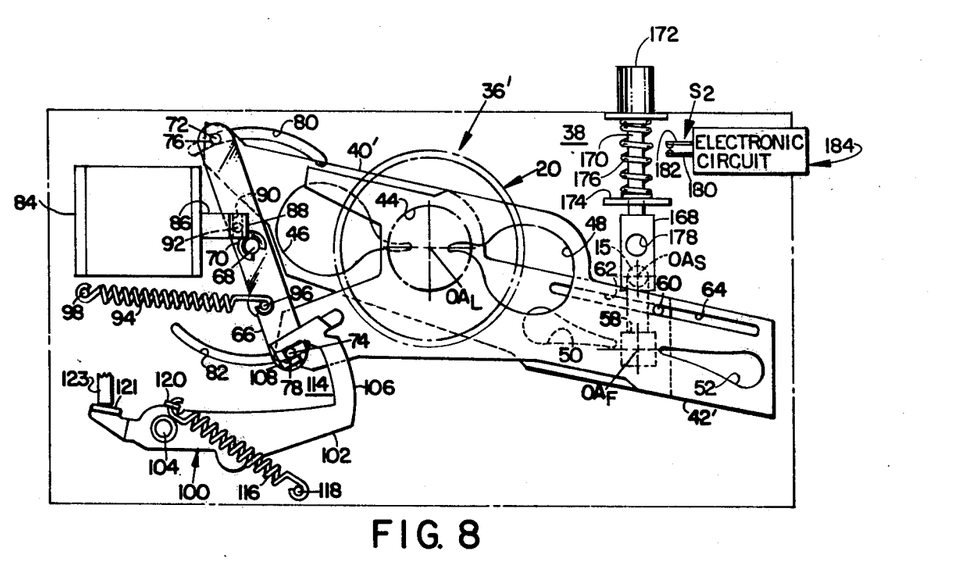
FIG. 8 is a front cross-sectional view of a portion of an alternate embodiment for the exposure control system of this invention.

Referring now to FIG. 8 there is shown an alternate embodiment for the exposure mechanism of this invention which is designated generally at 36'. The exposure mechanism 36' is in most respects similar to the exposure mechanism 36. However, the exposure mechanism 36' differs from the exposure mechanism 36 in that its blade elements, 40' and 42', have no specially configured portions corresponding to the tabs, 54 and 56. Instead the function that the tabs 54 and 56 perform in the preferred embodiment is, in the alternate embodiment 36', performed by a third blade element 168 which, along with the blade elements 40' and 42' comprise the blade apparatus of the alternate embodiment.

The blade element 168 has one of its edges fixedly attached to one end of a cylindrical push rod 170. The other end of the push rod 170 is connected with an actuating button 172 which extends through an aperture in the body 12 so that it is accessible to a user of the camera apparatus 10. The push rod 170 extends through an apertured bracket 174 which is fixedly attached to the base block 38. Surrounding the push rod 170 and positioned intermediate the bracket 174 and the base of the actuating button 172 is a compression spring 176 which continuously urges the blade element 168 into its arrangement as shown in FIG. 8.

The blade element 168 has an aperture 178 therein that is preferably larger than the aperture 19 and the entrance end of the fiber optic bundle 15. Mounted in this manner, the aperture 178 of the blade element 168 may be aligned with the optical axis, $OA_s$, of the second light path to the photodetector 58 in response to a user depressing the actuator button 172. When aligned with the optical axis, $OA_s$, it is obvious that the aperture 178 of blade element 168 unblocks the second light path to the photodetector 58 thereby allowing light from the scene to be transmitted to the surface of the photodetector 58. It is to be expressly assumed that the position of the blade element 168 as illustrated in FIG. 8 represents its second arrangement while its position of alignment with the optical axis, $OA_s$, (not shown) corresponds to its first arrangement while the first and second arrangements of the blade elements 40' and 42' are the same as those of the blade elements 40 and 42 of the preferred embodiment. Moreover, the drive means of the alternate embodiment comprise the drive means previously described with reference to the preferred embodiment and additionally include the compression spring 176.

In this manner the blade apparatus of the alternate embodiment comprises a third blade element, selectively actuable independent of the pair of opaque blade elements 40' and 42', having an aperture of predetermined size and location such that when its blade apparatus is in its first arrangement, the aperture 178 of the third blade element 168 is aligned with the second light path to the photodetector 58 thereby transmitting light from the scene to the photodetector's surface, and when its blade apparatus is in its second arrangement the aperture 178 of the third blade element 168 is misaligned with the second light path to the photodetector 58 thereby precluding transmission of light from the scene onto the photodetector's surface.

Figure 9:
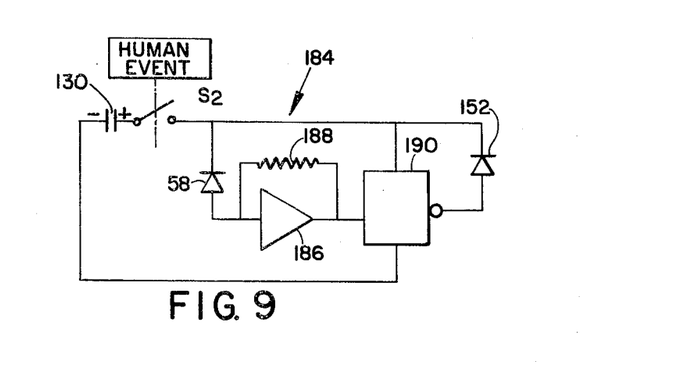
FIG. 9 is a schematic of a circuit which forms part of the alternate embodiment of this invention.

Additionally included in the alternate embodiment of the invention are a pair of switch contacts 180 and 182 which comprise a switch, S2. The switch S2 is normally open as illustrated in FIG. 8 and is closed by the actuator button 172 in response to the blade element 168 being placed in its position of alignment with the optical axis, OA$_S$. The switch S2 is connected to an electronic circuit 184 which is illustrated schematically in FIG. 9. The circuit 184 may receive its power from the battery 130 in a manner previously described. Included in the circuit 184 is the photodiode 58 which is again coupled to the battery 130 to operate in a reversed biased mode. The output of the photodiode 58 is coupled in common with the input of a conventional operational amplifier 186 having a feedback resistor 188 associated therewith in a well-known manner to produce an output voltage proportional to the intensity of the scene brightness. The output of the operational amplifier 186 and its feedback resistor 188 serves as the input to a conventional level detector, such as the Schmitt trigger type, 190 which is set to invert its input. The level detector 190 is set to produce a high voltage output (logic 1) when the scene brightness is below the predetermined value and a low voltage output (logic 0) when the scene brightness is above the predetermined value. The output of the level detector 190 serves to bias the LED 152 on and off in a manner previously described.

In this manner the alternate embodiment is provided with a level detecting means for monitoring the output signal of a light detecting means, measuring the scene brightness, and providing a discernible signal which is used to alert a user of the camera apparatus 10, via the LED 152, of the presence of a low scene brightness condition when the user closes the switch S2 by depressing the actuator button 172.

It will be obvious to those skilled in the electronic arts how to integrate the features of the circuit 184 and those of the electronic control system 122 to avoid any duplication of function in practicing the alternate embodiment.

Certain changes may be made in the above described embodiments without departing from the scope of the invention. For example, the functions of the actuator button 32 of the preferred embodiment and those of the actuator button 172 of the alternate embodiment may be incorporated in a single stroke actuator button having a first position along its travel at which the switch S2 is closed and a second position at which the switch S1 is closed. Those skilled in the art may make still other changes according to the teachings of the present invention. Therefore, it is intended that all matter contained in the above description or shown in the accompanying drawings shall be interpreted as illustrative and not in a limiting sense.

What is claimed is:

1. Photographic camera apparatus of the type having means for defining a film plane and an optical path for transmitting light from a scene along the optical path to expose photosensitive film located in the film plane, said apparatus comprising:

light detecting means, including a photodetector having a predetermined photosensitive surface, for receiving light from the scene and providing an output signal having an electrical characteristic which varies as a function of the intensity of the scene light incident on said photodetector's surface;

means for providing a first and a second light path for transmitting light from the scene to said photodetector's surface; each of said first and second light paths having light entrances which face the scene and are offset with respect to one another;

blade apparatus;

means for mounting said blade apparatus for displacement between a first arrangement in which said blade apparatus is simultaneously in light blocking relation to both the optical path and said first light path thereby precluding scene light from being transmitted along both the optical path and said first light path and in light unblocking relation to said second light path thereby allowing light from the scene to be transmitted along said second light path and onto said photodetector's surface, and a second arrangement in which said blade apparatus is simultaneously in light unblocking relation to both the optical path and said first light path and in light blocking relation to said second light path, said blade apparatus comprising first portions structured to define a primary varying aperture, aligned with the optical path, which changes from an initial value to a final value during displacement of said blade apparatus from its said first to its said second arrangement and to define a secondary varying aperture, aligned with said first light path, which also changes from an initial value to a final value during displacement of said blade apparatus from its said first to its said second arrangement, and at least one other portion adapted to block said second light path prior to said first portions defining said initial aperture value of said secondary varying aperture, said initial values of both said primary and secondary varying apertures occurring generally at the same time;

drive means actuable for displacing said blade apparatus between its said first and second terminal positions; and means energizable at least in part by a source of electrical energy for monitoring said output signal of said light detecting means and measuring scene brightness while said blade apparatus is in its said first arrangement and providing a discernible signal that has one characteristic which indicates that the scene brightness is below a predetermined level, for actuating said drive means when said scene brightness is above said predetermined level to displace said blade apparatus from its said first arrangement to provide said primary and secondary varying apertures aligned, respectively, with the optical path and said first light path thereby initiating an exposure interval during which scene light is transmitted substantially simultaneously along the optical path through said primary varying aperture and along said first light path onto said photodetector's surface through said secondary varying aperture, for integrating said output signal of said light detecting means beginning substantially at the commencement of said exposure interval, and actuating said drive means when the time integral of said output signal reaches a predetermined value to displace said blade apparatus to again block the optical path and said first light path thereby terminating said exposure interval, said blade apparatus serving to block said second light path during said exposure interval.

2. The apparatus of claim 1 wherein said first light path is arranged along an axis thereof that is generally perpendicular to and intersects said surface of said photodetector so that rays of light from the scene emerging from said entrance of said first light path proceed directly to said surface of said photodetector without changing direction, and wherein said second light path is arranged with its said entrance positioned along a line offset from and generally parallel with said axis of said first light path and includes an exit aligned to direct light onto said surface of said photodetector and means positioned intermediate its said entrance and exit for deviating the path of scene rays emerging from its said entrance so that such rays have their direction changed at least once prior to emerging from its said exit and impinging on said surface of said photodetector.

3. The apparatus of claim 2 wherein said means for providing said second light path comprise an elongated fiber optic bundle one end of which at least in part comprises said entrance of said second light path and the other end of which comprises said exit of said second light path.

4. The apparatus of claim 1 wherein all said portions of said blade apparatus are defined by a pair of opaque blade elements mounted for counter-reciprocating motion with respect to one another and each having first and second apertures of predetermined size and specially configured portions of predetermined size such that when said blade apparatus is in its said first arrangement, corresponding ones of said first and second apertures are misaligned with one another to respectively block the optical path and said first light path while corresponding ones of said specially configured portions are misaligned with one another to unblock said second light path, portions of corresponding ones of said first and second apertures progressively overlapping one another and becoming aligned with the optical path and said first light path to respectively define said primary and secondary varying apertures during displacement of said blade apparatus between its said first and second arrangements and portions of corresponding ones of said specially configured portions progressively overlapping one another and becoming aligned with said second light path to block passage of scene light to said photodetector's surface when said blade apparatus is displaced from its said first arrangement toward its said second arrangement.

5. The apparatus of claim 4 wherein said means for providing said second light path comprise an elongated fiber optic bundle one end of which at least in part comprises said entrance of said second light path and the other end of which defines an exit aligned with said surface of said photodetector to direct light emerging from said exit onto the surface of said photodetector.

6. The apparatus of claim 4 wherein said second apertures and said specially configured portions of said blade elements are spaced apart on their respective blade element so that, for any position of said blade apparatus, scene light cannot simultaneously be transmitted along both said first and said second light paths to said photodetector's surface.

7. The apparatus of claim 4 wherein said first light path is arranged along an axis thereof that is generally perpendicular to and intersects said surface of said photodetector so that rays of light from the scene emerging from said entrance of said first light path proceed directly to said surface of said photodetector without changing direction, and wherein said second light path is arranged with its said entrance positioned along a line offset from and generally parallel with said axis of said first light path and includes an exit aligned to direct light onto the surface of said photodetector and means positioned intermediate its said entrance and exit for deviating the path of scene rays emerging from its said entrance so that such rays have their direction changed at least once prior to emerging from its said exit and impinging on said surface of said photodetector.

8. The apparatus of claim 7 wherein said blade elements are flat thin members having a generally elongated shape and generally lie in a plane that is substantially perpendicular to said axis of said first light path, and wherein said apertures of each blade element are spaced apart, one after the other, generally along the longitudinal dimension of its respective blade element, and wherein said specially configured portion of each blade element is located along a longitudinal edge of its respective blade element generally adjacent a corresponding second aperture of its respective blade element.

9. The apparatus of claim 1 wherein said first portions of said blade apparatus comprise a pair of opaque blade elements mounted for counter-reciprocating motion with respect to one another, each of said blade elements having separate first and second apertures of predetermined size and location such that when said blade mechanism is in its said first arrangement, corresponding ones of said first and second apertures are misaligned with one another to respectively block the optical path and said first light path, portions of corresponding ones of said first and second apertures progressively overlapping one another and becoming aligned respectively with the optical path and said first light path to respectively define said primary and secondary varying apertures during displacement of said blade apparatus between its said first and second arrangements, and said other portion of said blade apparatus comprises a third blade element, selectively actuable independent of said pair of opaque blade elements, having an aperture of predetermined size and location such that when said blade apparatus is in its said first arrangement, said aperture of said third blade element is aligned with said second light path thereby transmitting light from the scene to said photodetector's surface, and when said blade apparatus is in its said second arrangement said aperture of said third blade element is misaligned with said second light path thereby precluding transmission of light from the scene onto said photodetector's surface.

10. The apparatus of claim 9 wherein said drive means includes means for automatically displacing said third blade element from its said first arrangement toward its said second arrangement.

11. The apparatus of claim 9 wherein said means for providing said second light path comprise an elongated fiber optic bundle one end of which at least in part comprises said entrance of said second light path and the other end of which defines an exit aligned with said surface of said photodetector to direct light emerging from said exit onto the surface of said photodetector.

12. The apparatus of claim 9 wherein said first light path is arranged along an axis thereof that is generally perpendicular to and intersects said surface of said photodetector so that rays of light from the scene emerging from said entrance of said first light path proceed directly to said surface of said photodetector without changing direction, and wherein said second light path is arranged with its said entrance positioned along a line offset from and generally parallel with said axis of said first light path and includes an exit aligned to direct light onto the surface of said photodetector and means positioned intermediate its said entrance and exit for deviating the path of scene rays emerging from its said entrance so that such rays have their direction changed at least once prior to emerging from its said exit and impinging on said surface of said photodetector.

13. The apparatus of claim 12 wherein said means for providing said second light path comprise an elongated fiber optic bundle one end of which at least in part comprises said entrance of said second light path and the other end of which comprises said exit of said second light path.

14. The apparatus of claim 9 wherein said last stated means of claim 1 includes level detecting means for monitoring said output signal of said light detecting means, measuring the scene brightness, and providing said discernible signal, and wherein said apparatus further includes means responsive to the placement of said third blade element into its said first arrangement for coupling said level detecting means to a source of electrical energy to supply power to said level detecting means and for uncoupling said level detecting means from the source of electrical energy in response to said third blade element being in its said second arrangement.

15. The apparatus of claim 14 further including means responsive to said discernible signal of said level detecting means for providing a user of said apparatus with a visual signal which indicates that the scene brightness is greater than said predetermined value.

16. The apparatus of claim 1 wherein said last stated means includes means for inhibiting the actuation of said drive means of said apparatus to inhibit exposure of the film if the scene brightness is below said predetermined level.

17. The apparatus of claim 16 further including means responsive to said characteristic of said discernible signal for providing a visual signal observable to the user of said apparatus indicating that the scene brightness is below said predetermined level.

18. The apparatus of claim 1 wherein said last stated means includes means for terminating monitoring of said output signal of said light detecting means and beginning integration of said output signal of said light detecting means at a predetermined time after the actuation of said drive means, said predetermined time occurring substantially at the commencement of said exposure interval.

19. The apparatus of claim 1 wherein said last stated means comprise:
  (a) electronic timing means operative to provide a signal at a predetermined time after the actuation of said drive means;
  (b) level detecting means for monitoring said output signal of said light detecting means, measuring the scene brightness and providing said discernible signal and de-energized in response to said timing signal;
  (c) integrating means energized by said timing signal to integrate said output signal of said light detecting means until the time integral of said output signal reaches a predetermined value at which time said integrating means is configured to provide an output signal; and
  (d) electronic logic means energized at the actuation of said drive means and thereafter responsive to said output of said integrating means to cause said drive means to displace at least said first portions of said blade apparatus into its said first arrangement.

20. The apparatus of claim 19 wherein said predetermined time occurs substantially at the commencement of said exposure interval after actuation of said drive means.

21. The apparatus of claim 1 wherein said last stated means is further configured to provide said discernible signal with another characteristic which indicates that the scene brightness is above said predetermined value and to be responsive to said discernible signal to inhibit actuation of said drive means if it receives said discernible signal having said one characteristic and to cause at least part of said drive means to displace said blade apparatus from its said first arrangement toward its said second arrangement only if it receives said discernible signal with said other characteristic.

22. The apparatus of claim 21 further including means responsive to said discernible signal of said level detecting means for providing a user of said apparatus with a visual signal which indicates that the scene brightness is greater than said predetermined value.

* * * * *